US010697388B2

(12) United States Patent
Zielinski et al.

(10) Patent No.: US 10,697,388 B2
(45) Date of Patent: Jun. 30, 2020

(54) METHOD AND SYSTEM FOR CALIBRATING EXHAUST VALVES

(71) Applicant: Transportation IP Holdings, LLC, Norwalk, CT (US)

(72) Inventors: David Zielinski, Erie, PA (US); Luke Michael Henry, Erie, PA (US); Matthew John Malone, Boulder, CO (US); Harsha Vardhana, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 909 days.

(21) Appl. No.: 15/343,511

(22) Filed: Nov. 4, 2016

(65) Prior Publication Data

US 2017/0051698 A1 Feb. 23, 2017

Related U.S. Application Data

(63) Continuation-in-part of application No. 13/749,893, filed on Jan. 25, 2013, now abandoned.
(Continued)

(51) Int. Cl.
*F02D 41/24* (2006.01)
*F02D 41/00* (2006.01)
(Continued)

(52) U.S. Cl.
CPC ......... *F02D 41/2464* (2013.01); *F01D 25/32* (2013.01); *F02B 37/013* (2013.01); *F02B 37/18* (2013.01); *F02B 75/18* (2013.01); *F02D 13/0242* (2013.01); *F02D 41/0007* (2013.01); *F02D 41/0077* (2013.01); *F02D 41/2441* (2013.01); *F02M 26/08* (2016.02);
(Continued)

(58) Field of Classification Search
CPC ........ F01D 25/32; F02B 37/013; F02B 37/18; F02B 75/18; F02D 13/0242; F02D 41/0007; F02D 41/0065; F02D 41/0077; F02D 41/2464; F02D 41/2441; F02D 41/0072; F02D 41/0002; F02M 26/08; F02M 26/43; F05D 2220/40; Y02T 10/144; Y02T 10/47
USPC .............................. 60/606; 123/568.21, 703
See application file for complete search history.

(56) References Cited

U.S. PATENT DOCUMENTS 5,577,385 A 11/1996 Kapich
6,318,086 B1 11/2001 Laustela et al.
(Continued)

*Primary Examiner* — Patrick Hamo
*Assistant Examiner* — Paul W Thiede
(74) *Attorney, Agent, or Firm* — McCoy Russell LLP

(57) ABSTRACT

Various methods and systems are provided for calibrating one or more exhaust valves. In one example, a system comprises an exhaust valve configured to control flow of exhaust gas exiting an engine and a controller configured to calibrate the exhaust valve by commanding the exhaust valve to a fully closed position with a first driving current and measuring a first position of the exhaust valve at the first driving current, commanding the exhaust valve to a fully open position with a second driving current and measuring a second position of the exhaust valve at the second driving current, and generating a map based on a linear function determined from the first driving current, the second driving current, the measured first position, and the measured second position. The controller is further configured to adjust a position of the exhaust valve based on the map.

19 Claims, 6 Drawing Sheets

Related U.S. Application Data

(60) Provisional application No. 62/262,283, filed on Dec. 2, 2015.

(51) Int. Cl.
| | |
|---|---|
| *F02D 13/02* | (2006.01) |
| *F02B 75/18* | (2006.01) |
| *F02M 26/43* | (2016.01) |
| *F02M 26/08* | (2016.01) |
| *F02B 37/18* | (2006.01) |
| *F02B 37/013* | (2006.01) |
| *F01D 25/32* | (2006.01) |

(52) U.S. Cl.
CPC ......... *F02M 26/43* (2016.02); *F02D 41/0065* (2013.01); *F05D 2220/40* (2013.01); *Y02T 10/144* (2013.01); *Y02T 10/47* (2013.01)

(56) References Cited

U.S. PATENT DOCUMENTS

| | | | |
|---|---|---|---|
| 7,921,646 | B2 | 4/2011 | Swenson et al. |
| 10,221,798 | B2 * | 3/2019 | Mischler ............. F02D 41/0002 |
| 2009/0158733 | A1 | 6/2009 | Swenson et al. |
| 2010/0139269 | A1 | 6/2010 | Heyes et al. |
| 2012/0325189 | A1 * | 12/2012 | Takezoe ............. F02D 41/0077 |
| | | | 123/568.21 |
| 2013/0343929 | A1 | 12/2013 | Tombers |
| 2016/0115883 | A1 * | 4/2016 | Mischler ............. F02D 41/0072 |
| | | | 123/703 |

\* cited by examiner

METHOD AND SYSTEM FOR CALIBRATING EXHAUST VALVES

CROSS-REFERENCE OF RELATED APPLICATIONS

The present application is a continuation-in-part of U.S. application Ser. No. 13/749,893, entitled, "TURBOCHARGER, SYSTEM, AND METHOD FOR DRAINING FLUID FROM A TURBOCHARGER," filed on Jan. 25, 2013. The present application also claims priority to U.S. Provisional Application No. 62/262,283, entitled, "METHOD AND SYSTEM FOR CALIBRATING EXHAUST VALVES," filed Dec. 2, 2015. The entire contents of the above-referenced applications are hereby incorporated by reference for all purposes.

BACKGROUND

Technical Field

Embodiments of the subject matter disclosed herein relate to engines, engine systems, and methods for operating engine systems, for example.

Discussion of Art

Exhaust gas recirculation (EGR) lowers peak combustion temperatures and hence lowers NOx production, and thus engine systems may be configured to tightly control EGR in order to maintain emissions under designated limits. One or more exhaust gas flow control valves in the exhaust of an engine system may be adjusted in order to control the amount of EGR directed to the engine and/or control the amount of boost pressure. Accurate control of the amount of EGR supplied to the engine relies on accurate knowledge of each exhaust valve position as well as accurate knowledge of the amount of driving current required to reach a desired exhaust valve position. However, valve-to-valve variability and day-to-day wear may introduce inaccuracies into the exhaust valve position control.

BRIEF DESCRIPTION

In an embodiment, a system includes an exhaust valve controlling flow of exhaust gas exiting an engine and a controller configured to calibrate the exhaust valve by commanding the exhaust valve to a fully closed position with a first driving current and measuring a first position of the exhaust valve at the first driving current, commanding the exhaust valve to a fully open position with a second driving current and measuring a second position of the exhaust valve at the second driving current, and generating a map based on a linear function determined from the first driving current, the second driving current, the measured first position, and the measured second position. The controller is further configured to adjust a position of the exhaust valve based on the map.

DETAILED DESCRIPTION

Figure 1A:
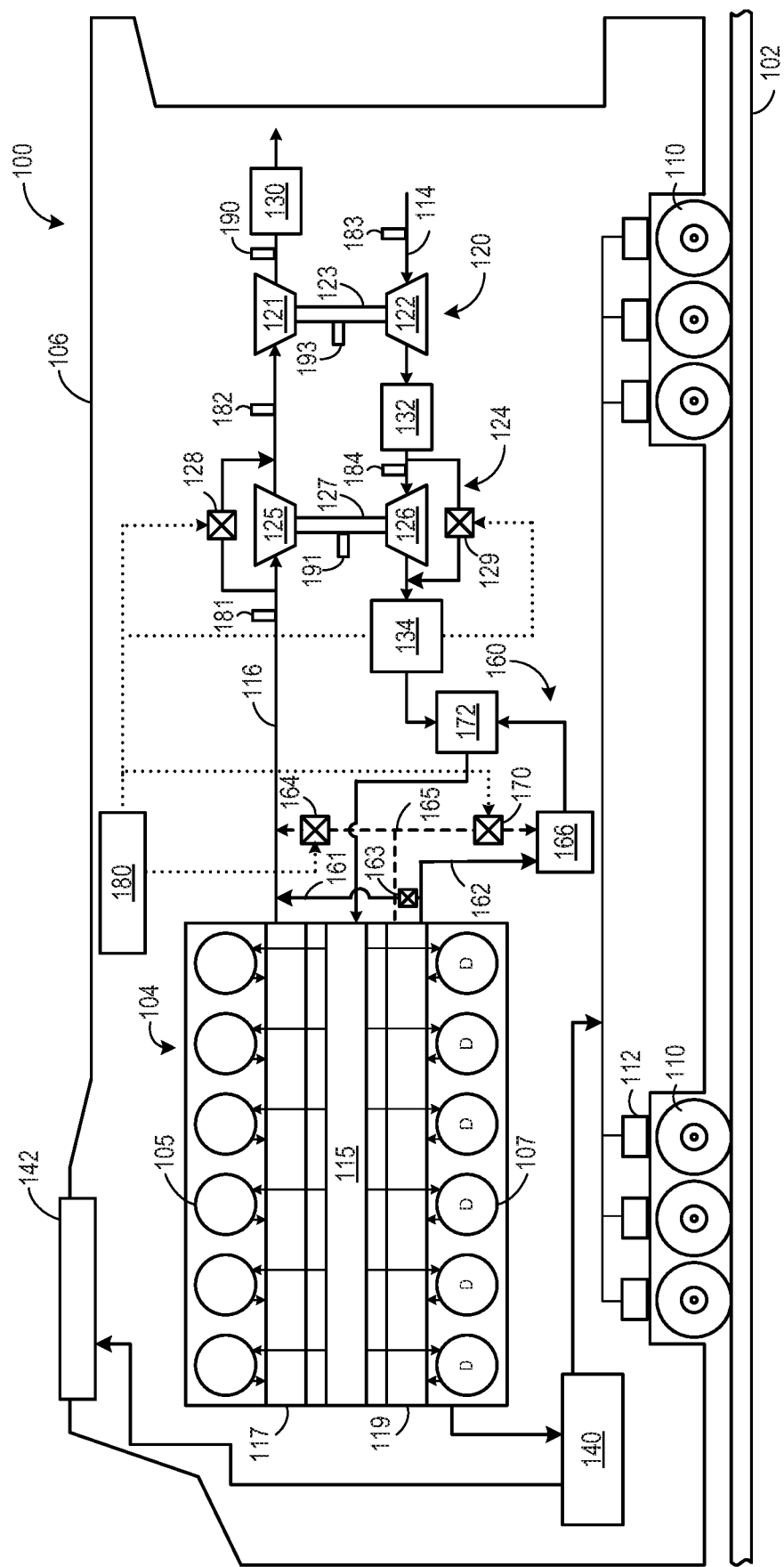
FIG. 1A shows a schematic diagram of a rail vehicle with an engine according to an embodiment of the invention.

The following description relates to an engine system that may be included in a vehicle, such as the engine system of FIG. 1A. The engine system includes an exhaust valve controlling flow of exhaust gas exiting an engine, such as the exhaust valve of FIG. 1B, and a controller configured to calibrate the exhaust valve. The exhaust valve may be a valve controlling flow of exhaust back to the intake of the engine and/or the exhaust valve may be a valve controlling flow of exhaust gas around a turbine, for example. The controller may calibrate the exhaust valve by commanding the exhaust valve to a fully closed position by supplying a first driving current to the exhaust valve (e.g., no supplied current) and measuring a first position of the exhaust valve with a position sensor. The calibration may further include commanding the exhaust valve to a fully open position by supplying a second driving current to the exhaust valve (e.g., a maximum amount of supplied current for fully opening the exhaust valve) and measuring a second position of the exhaust valve with the position sensor. The calibration also includes generating a map based on a linear function determined from the first driving current, the second driving current, the measured first position, and the measured second position. In some examples, the exhaust valve may be commanded to one or more intermediate positions between fully open and fully closed by supplying intermediate values of the driving current and one or more intermediate positions of the exhaust valve may be measured, and the map may be further generated based on the measured one or more intermediate positions. Based on the map, the controller may be configured to adjust a position of the exhaust valve. Example routines for carrying out the calibration and operational plots during the calibration are illustrated in FIGS. 2-4.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for calibrating one or more exhaust valves, an example of a platform is disclosed in which the engine system may be installed in a vehicle, such as a rail vehicle. For example, FIG. 1A shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above. In one embodiment herein, the engine is a multi-fuel engine operating with diesel fuel and natural gas, but in other examples the engine may use various combinations of fuels other than diesel and natural gas.

The engine receives intake air for combustion from an intake, such as an intake manifold 115. The intake may be any suitable conduit or conduits through which gases flow to enter the engine. For example, the intake may include the intake manifold, an intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold 117, the exhaust passage, and the like. Exhaust gas flows through the exhaust passage, and out of an exhaust stack of the rail vehicle. In one example, the engine is a diesel engine that combusts air and diesel fuel through compression ignition. In other non-limiting embodiments, the engine may combust fuel including gasoline, kerosene, biodiesel, or other petroleum distillates of similar density through compression ignition (and/or spark ignition).

In one embodiment, the rail vehicle is a diesel-electric vehicle. As depicted in FIG. 1A, the engine is coupled to an electric power generation system, which includes an alternator/generator 140 and electric traction motors 112. For example, the engine is a diesel engine that generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of a plurality of wheels to provide tractive power to propel the rail vehicle. One example configuration includes one traction motor per wheel. As depicted herein, six pairs of traction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1A, the engine is a V-12 engine having twelve cylinders. In other examples, the engine may be a V-6, V-8, V-10, V-16, I-4, I-6, I-8, opposed 4, or another engine type. As depicted, the engine may include a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders. In yet another embodiment, the engine may not include any donor cylinders and instead include only non-donor cylinders. In another embodiment, exhaust gas recirculation (EGR) may be provided from a bank of cylinders supplying a manifold with exhaust and then this exhaust may be supplied to an air intake. In some embodiments, all cylinders of the engine may selectively provide EGR to an engine intake passage via an EGR system, as explained further below.

As depicted in FIG. 1A, the non-donor cylinders are coupled to the exhaust passage to route exhaust gas from the engine to atmosphere (after it passes through an optional exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., NOR).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, in some embodiments, the EGR system may include an EGR bypass passage 161 that is configured to divert exhaust from the donor cylinders back to the exhaust passage. The EGR bypass passage may be controlled via a first valve 163. The first valve may be configured with a plurality of restriction points such that a variable amount of exhaust is routed to the exhaust, in order to provide a variable amount of EGR to the intake.

In an alternate embodiment shown in FIG. 1A, the donor cylinders may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler and/or additional elements prior to being routed to the intake passage. Further, the alternate EGR system includes a third valve 164 disposed between the exhaust passage and the alternate EGR passage.

The third valve and second valve may be on/off valves controlled by the control unit 180 (for turning the flow of EGR on or off), or they may control a variable amount of EGR, for example. In some examples, the third valve may be actuated such that an EGR amount is reduced (exhaust gas flows from the alternate EGR passage to the exhaust passage). In other examples, the third valve may be actuated such that the EGR amount is increased (e.g., exhaust gas flows from the exhaust passage to the alternate EGR passage). In some embodiments, the alternate EGR system may include a plurality of EGR valves or other flow control elements to control the amount of EGR.

In such a configuration, the third valve 164 is operable to route exhaust from the donor cylinders to the exhaust passage of the engine and the second valve 170 is operable to route exhaust from the donor cylinders to the intake passage of the engine. As such, the third valve may be referred to as an EGR bypass valve, while the second valve may be referred to as an EGR metering valve. In the embodiment shown in FIG. 1A, the third valve and the second valve may be engine oil, or hydraulically, actuated valves, for example, with a shuttle valve (not shown) to modulate the engine oil. In some examples, the valves may be actuated such that one of the third and second valves is normally open and the other is normally closed. In other examples, the third and second valves may be pneumatic valves, electric valves, or another suitable valve.

As shown in FIG. 1A, the vehicle system further includes an EGR mixer 172 which mixes the recirculated exhaust gas with charge air such that the exhaust gas may be evenly distributed within the charge air and exhaust gas mixture. In the embodiment depicted in FIG. 1A, the EGR system is a high-pressure EGR system which routes exhaust gas from a location upstream of the turbochargers in the exhaust passage to a location downstream of the turbochargers in the intake passage. In other embodiments, the vehicle system may additionally or alternatively include a low-pressure EGR system which routes exhaust gas from downstream of the turbochargers in the exhaust passage to a location upstream of the turbochargers in the intake passage.

As depicted in FIG. 1A, the vehicle system may further include a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In alternate embodiments, the engine system may only include a single stage turbocharger with only a single turbine and single compressor.

In the embodiment shown in FIG. 1A, the second turbocharger is provided with a turbine bypass valve (TBV) 128 which allows exhaust gas to bypass the second turbocharger. The turbine bypass valve may be opened, for example, to divert the exhaust gas flow away from and around the second turbine. In this manner, the rotating speed of the second compressor, and thus the boost provided by the turbochargers to the engine may be regulated. For example, by increasing the opening of the TBV, the speed of the turbine and thus the compressor mechanically coupled with the turbine may decrease, thereby decreasing boost provided to the engine. Decreasing boost may decrease an intake manifold pressure (MAP) of the engine.

Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor 126 to avoid compressor surge, for example. In some embodiments, the first turbocharger may also be provided with a compressor bypass valve, while in other embodiments, only first turbocharger may be provided with a compressor bypass valve.

The vehicle system further includes the exhaust treatment system coupled in the exhaust passage in order to reduce regulated emissions. As depicted in FIG. 1A, the exhaust gas treatment system is disposed downstream of the first turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a NO trap, and/or various other emission control devices or combinations thereof. In alternate embodiments, the vehicle system may not include the exhaust aftertreatment system.

The exhaust passage may further include an exhaust gas sensor 190. The exhaust gas sensor measures an exhaust emission value (e.g., level) of the exhaust gas. For example, the exhaust gas sensor may measure a content of the exhaust gas. In one example, the exhaust emission value may be an amount of oxygen and/or NOx in the exhaust gas. As such, the exhaust gas sensor may measure both an oxygen and NOx level of the exhaust gas flowing through the exhaust passage. In another example, the exhaust passage may include two exhaust gas sensors, a first measuring exhaust oxygen content and a second measuring exhaust NOx content. The exhaust gas sensor is shown positioned downstream from the turbochargers and upstream of the exhaust gas treatment system. However, in alternate embodiments the exhaust gas sensor may be positioned in alternate locations in the exhaust passage, such as upstream of the turbochargers or between the two turbocharger stages. The exhaust gas sensor may alternatively be positioned in orificed side-sample lines that bypass the one or more turbines. In one example, the exhaust gas sensor may be a universal exhaust gas oxygen sensor (UEGO) or another appropriate exhaust constituent sensor.

The vehicle system further includes the control unit 180, which is provided and configured to control various components related to the vehicle system. In one example, the control unit includes a computer control system (e.g., referred to herein as a controller). The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, sensor 184 arranged in the inlet of the high-pressure compressor, and the exhaust gas sensor. The sensors arranged in the inlets of the turbochargers may detect air temperature and/or pressure. In one example, a pressure difference across the TBV (and high pressure turbine) may be determined based on a difference between turbine inlet pressure (measured by sensor 181) and turbine outlet pressure (measure by sensor 182).

The second turbocharger may also include a speed sensor 191 for measuring turbine speed (e.g., high pressure turbine speed) of the second turbocharger and the first turbocharger may also include a speed sensor 193 for measuring turbine speed of the first turbocharger. In some embodiments, the engine may include a sensor for measuring peak cylinder pressure. Additional sensors may include, but are not limited to, engine speed, engine load, boost pressure, ambient pressure, exhaust temperature, exhaust pressure, etc. Correspondingly, the control unit may control the vehicle system by sending commands to various components such as traction motors, alternator, cylinder valves, throttle, heat exchangers, wastegates or other valves or flow control elements, etc. For example, the controller may send commands to an actuator of a fuel injector or exhaust valve of an individual cylinder, thereby adjusting operation of the individual cylinder based on the received command.

In some examples, a compressed air line (not shown) may couple the outlet of the high-pressure compressor to the low-pressure turbine. The compressed air line may provide air of higher pressure than the exhaust downstream of low-pressure turbine in order to prevent leakage of exhaust out of the low-pressure turbine during engine operation. In some embodiments, the compressed air line may couple the outlet of a compressor of a supercharger (not shown in FIG. 1) driven by the engine. A drain passage may be coupled to a casing of the low-pressure turbine in a cavity. The drain passage may comprise an opening at the bottom of the cavity and/or other suitable fluid drainage configuration, such as a straw, nipple, etc. The drain passage may lead out of the turbine casing and to atmosphere (e.g., external to the vehicle/system in which the turbocharger is installed). In this way, fluid such as water may passively drain out of the turbine.

However, the drain passage may provide a path for the exhaust gas flowing through the turbocharger. In some examples, the exhaust gas may leak out of turbine to the vehicle cabin or other vehicle compartment via the drain passage. To prevent the leak of exhaust gas via the drain passage, the drain passage may be supplied with pressurized air during engine operation. In one example, compressed intake air from downstream of a high-pressure compressor (such as second compressor 126 of FIG. 1A) may be directed to the drain passage via the compressed air line.

In an example, the compressed air line may include an air jet or ejector, venturi, nozzle, etc., that creates an increase in velocity of the air moving through the compressed air line. The air jet may include a restricted throat or other configuration that creates vacuum when compressed air is drawn through the compressed air line. This vacuum may act to also drawn in air from atmosphere and/or otherwise block leakage of exhaust from the drain passage. As such, to prevent leakage of exhaust from the drain passage, air at greater than atmospheric pressure is supplied to the compressed air line during all engine operating conditions.

Figure 1B:
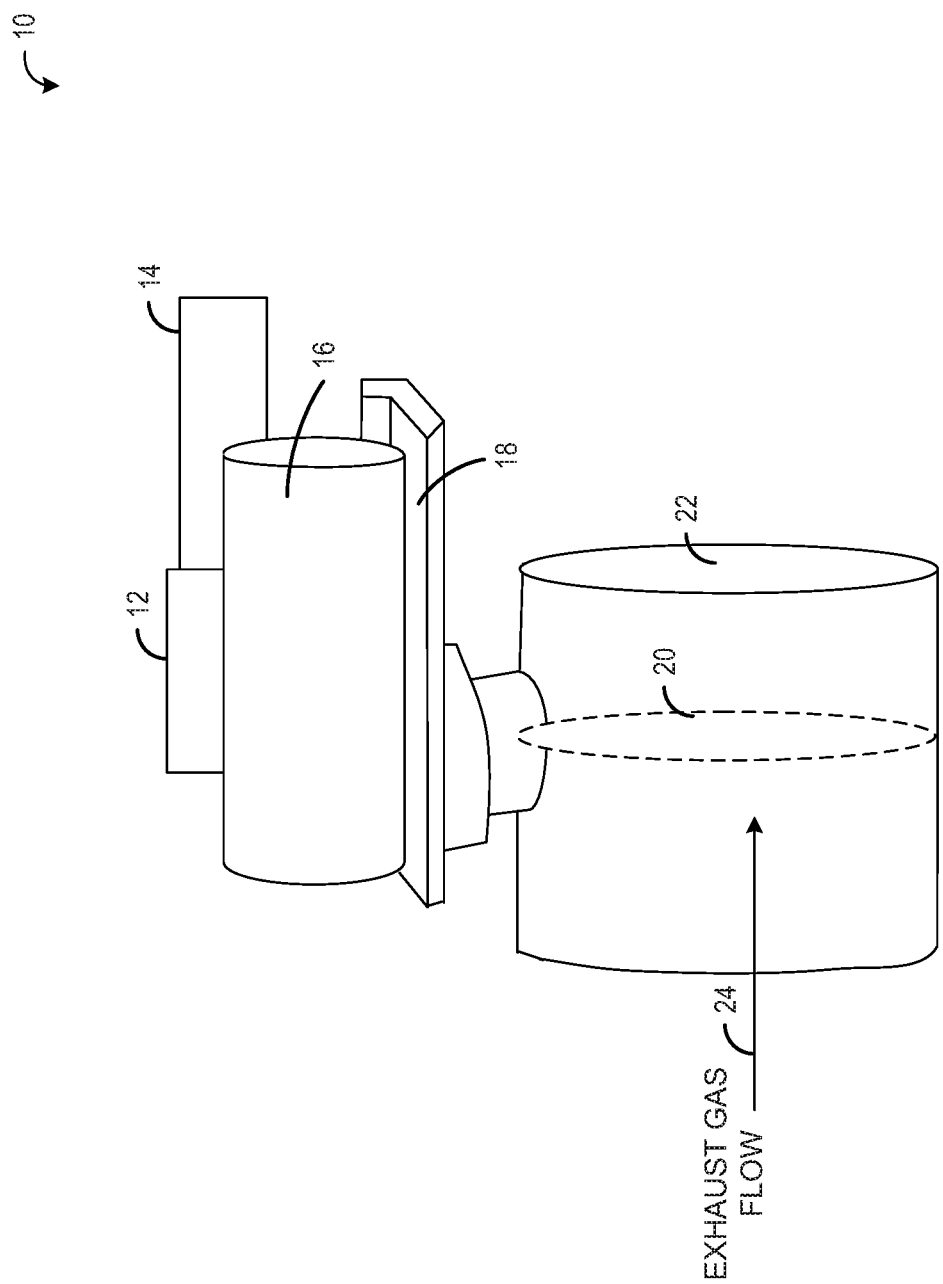
FIG. 1B shows a schematic diagram of an example exhaust valve that may be included in the rail vehicle of FIG. 1A.
Figure 2:
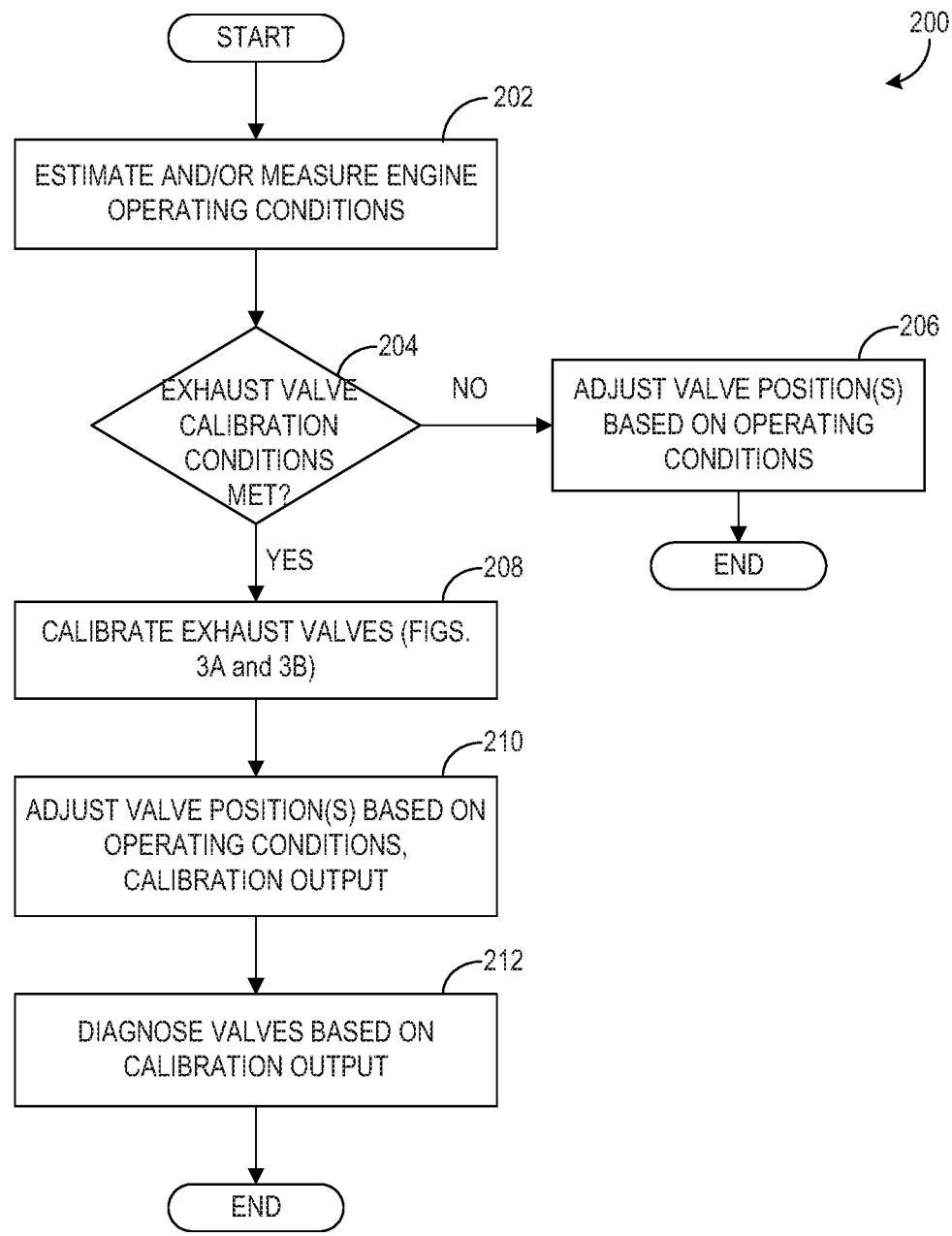
FIG. 2 shows a flow chart of a method for adjusting exhaust valve position based on exhaust valve calibration output.

FIG. 1B illustrates an example engine exhaust passage valve 10. The exhaust passage valve 10 may be a suitable valve in the engine exhaust system, such as an EGR valve (e.g., valve 163, 164, and/or valve 170) or turbine bypass valve (e.g., valve 128). The exhaust passage valve is located downstream of the engine in a passage configured to flow exhaust gas. As such, it is separate from and located downstream of the cylinder exhaust valves.

Valve 10 is illustrated in FIG. 1B as an oil control valve. Oil is provided to the valve via oil line fittings 12. The oil is used in actuator 16 to adjust the position of butterfly plate 20, which is located in casing 22. Control of oil to the actuator may be provided by a solenoid valve that is activated in response to a signal from the engine control unit. Casing 22 may be fitted in an exhaust passage, for example. Further, the position of exhaust passage valve 10 is determined from position sensor 14. Position sensor 14 may be a suitable sensor, such as a linear variable differential transducer, rotary encoder, or other suitable position sensor configured to output a signal (e.g., a voltage signal) representative of the position of the butterfly plate to the engine control unit (e.g. control unit 180). Further, in some examples the components of the valve head (the oil fittings 12, actuator 16, and position sensor 14) may be protected from exhaust heat via heat shield 18.

Thus, the position sensor of the exhaust valve may output a voltage signal to the control unit. The control unit may convert the voltage signal into a representation of the position of the exhaust valve, such as degrees (e.g., where 0° indicates fully closed and 90° indicates fully open) or percent restriction of the exhaust passage (e.g., where 0% indicates fully open and 100% indicates fully closed). The exhaust valve position may be adjusted in order to reach a designated position, based on operating parameters such as designated intake oxygen concentration, for example. If the current position of the exhaust valve does not match the designated position, the position of the exhaust valve may be changed. To change the position of the exhaust valve, the driving current supplied to the solenoid of the actuator may be adjusted.

In order to provide accurate control of position of the exhaust valve, for example to provide accurate control of intake oxygen concentration, the control unit may calibrate the exhaust valve in order to determine the relationship between the position sensor output and actual exhaust valve position and to determine the relationship between the driving current supplied to the exhaust valve and the actual exhaust valve position at that driving current. As these relationships may change over the course of operation of the engine system, the control unit may calibrate the exhaust valve periodically, such as each time the engine is started. In doing so, accurate control of valve position may be maintained, even as aspects of the exhaust valve change over time.

FIG. 2 shows a flow chart for a method 200 for adjusting exhaust valve position based on a calibration routine of the exhaust valves in a multi-cylinder engine. Method 200 may be carried out by an electronic controller, such as control unit 180 of FIG. 1A, according to non-transitory instructions stored in memory of the controller. Method 200 may adjust exhaust valve position based on calibration output for one or more exhaust valves, such as EGR valves 163, 164, and/or 170 and/or turbine bypass valve 128 of FIGS. 1A and 1B. In one example, method 200 may executed for each of the EGR valves and TBV in order to adjust the position of the two EGR valves and the TBV based on a calibration routine.

At 202, engine operating conditions are assessed, such as engine on or off, engine load, engine speed, etc. Method 200 proceeds to 204 to assess if exhaust valve calibration conditions are met. In one example, the exhaust valves may be calibrated only when the engine is operating, as the exhaust valves are hydraulically operated valves which utilize pressurized engine oil for operation, and hence the exhaust valves cannot be adjusted while the engine is off. However, in other examples where the exhaust valves are not hydraulically actuated (or if the hydraulic supply to the exhaust valves is an auxiliary supply that does not rely on engine operation), the calibration routine may be carried out when the engine is off. Additionally, in some examples the calibration conditions may include the engine operating at idle. As will be described in more detail below with respect to FIGS. 3A and 3B, during execution of the calibration routine, each exhaust valve (e.g., EGR valves 164 and 170 and TBV 128) may be commanded to be fully open and commanded to be fully closed. However, due to the arrangement of the exhaust valves in the engine, and due to the fact that the engine may be operating during the calibration routine, exhaust flow issues may arise during execution of the calibration routine. For example, when the TBV is fully opened, a relatively small amount of energy flows into and out of the high pressure turbocharger. This may result in an engine airflow restriction through the turbocharger compressor leading to engine bog or undesired vacuum in certain engine system components. To minimize the vacuum created by this restriction, the flow through the turbocharger compressor may be reduced by utilizing the donor cylinders to pump undiluted (or minimally diluted) intake air back to the intake system (e.g., increasing EGR flow directly reduces flow through the turbocharger compressor), and this operation may only occur at idle engine loads. Accordingly, the exhaust valves may be calibrated only when the engine is in idle operation.

In one example, the calibration of the exhaust valve may be performed responsive to an engine start event. In another example, a threshold amount of time elapsing since a previous engine start event or previous calibration process may initiate the calibration process. At 204, if exhaust valve calibration conditions are not met, the method 200 proceeds to 206, where exhaust valve position(s) are adjusted based on engine operating conditions and calibration output from a previously performed calibration. As a specific example, the exhaust valve may be an EGR metering valve configured to control flow of exhaust from the donor cylinders back to the intake of the engine (e.g., valve 170 of FIG. 1A). The position of the EGR metering valve may be adjusted based on a difference between a current position and a desired position, where the desired position is a position determined to provide a designated intake oxygen concentration, for example. In order to determine the current position, feedback from the position sensor of the EGR metering valve is obtained, which may in the form of a voltage signal. This voltage signal may be input into a first calibration map, described in more detail below, that outputs EGR metering valve position based on the voltage signal. The desired position is then input into a second calibration map, also described in more detail below, that outputs a driving current to be supplied to the solenoid of the EGR metering valve in order to reach the desired position. The difference between the driving current currently supplied to the EGR metering valve and the driving current output from the second calibration map may then be used to adjust the position of the EGR metering valve.

Figure 3A:
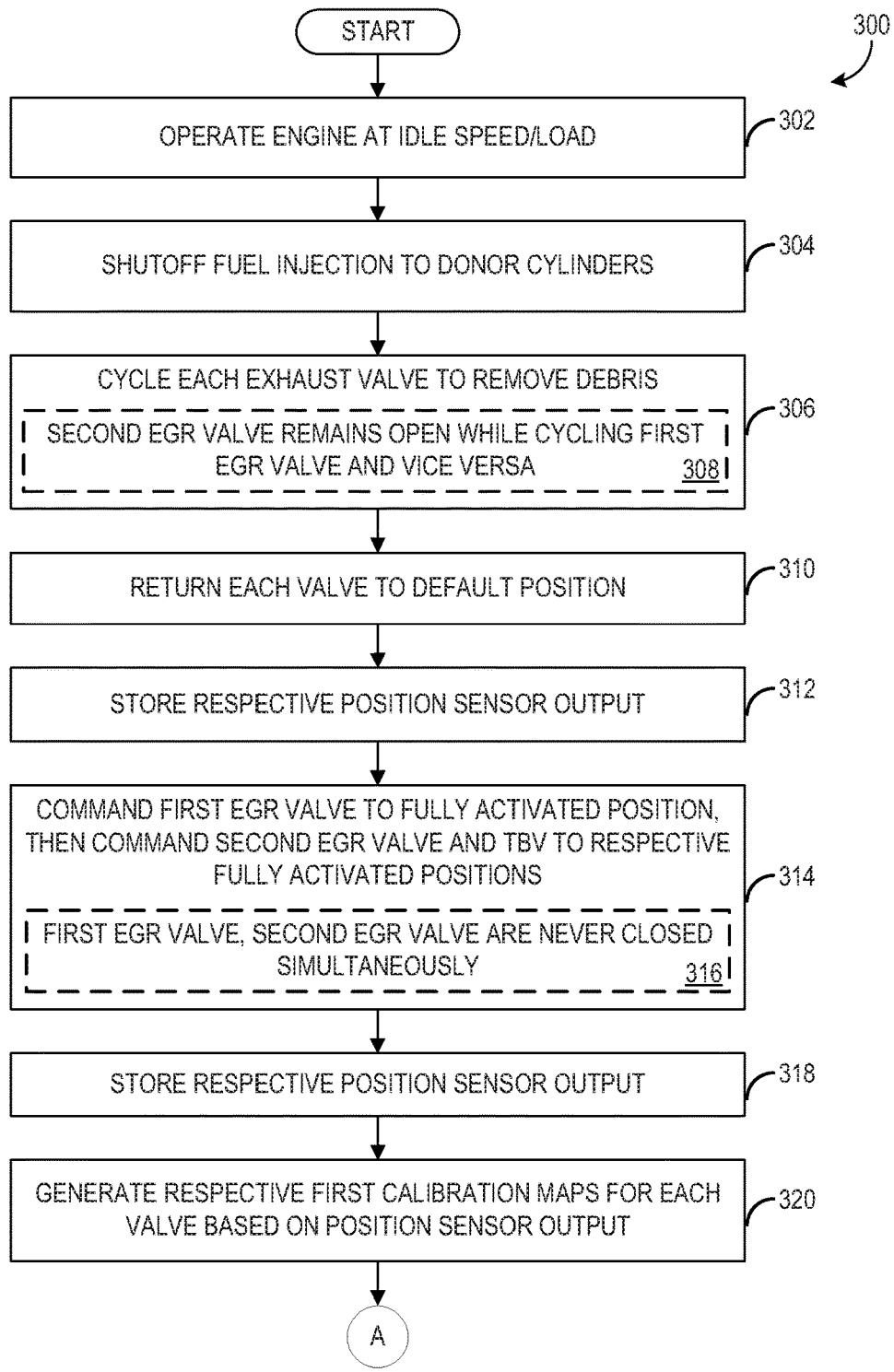
FIG. 3A shows a flow chart of a method for generating first set of calibration maps for a plurality of exhaust valves based on position sensor output.
Figure 3B:
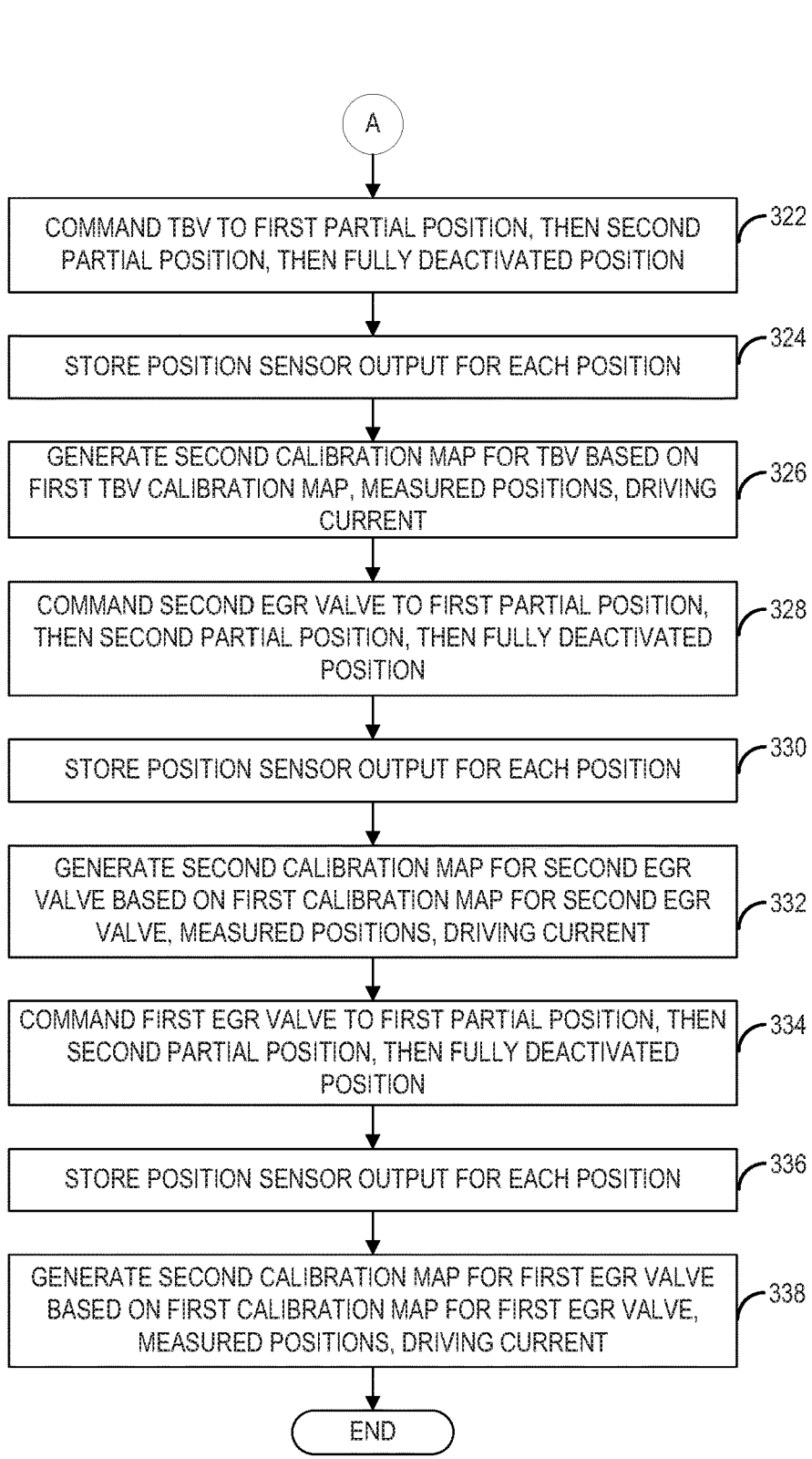
FIG. 3B shows a flow chart of a method for generating second set of calibration maps for a plurality of exhaust valves based on driving current to reach a selected set of positions of the valves.
Figure 4:
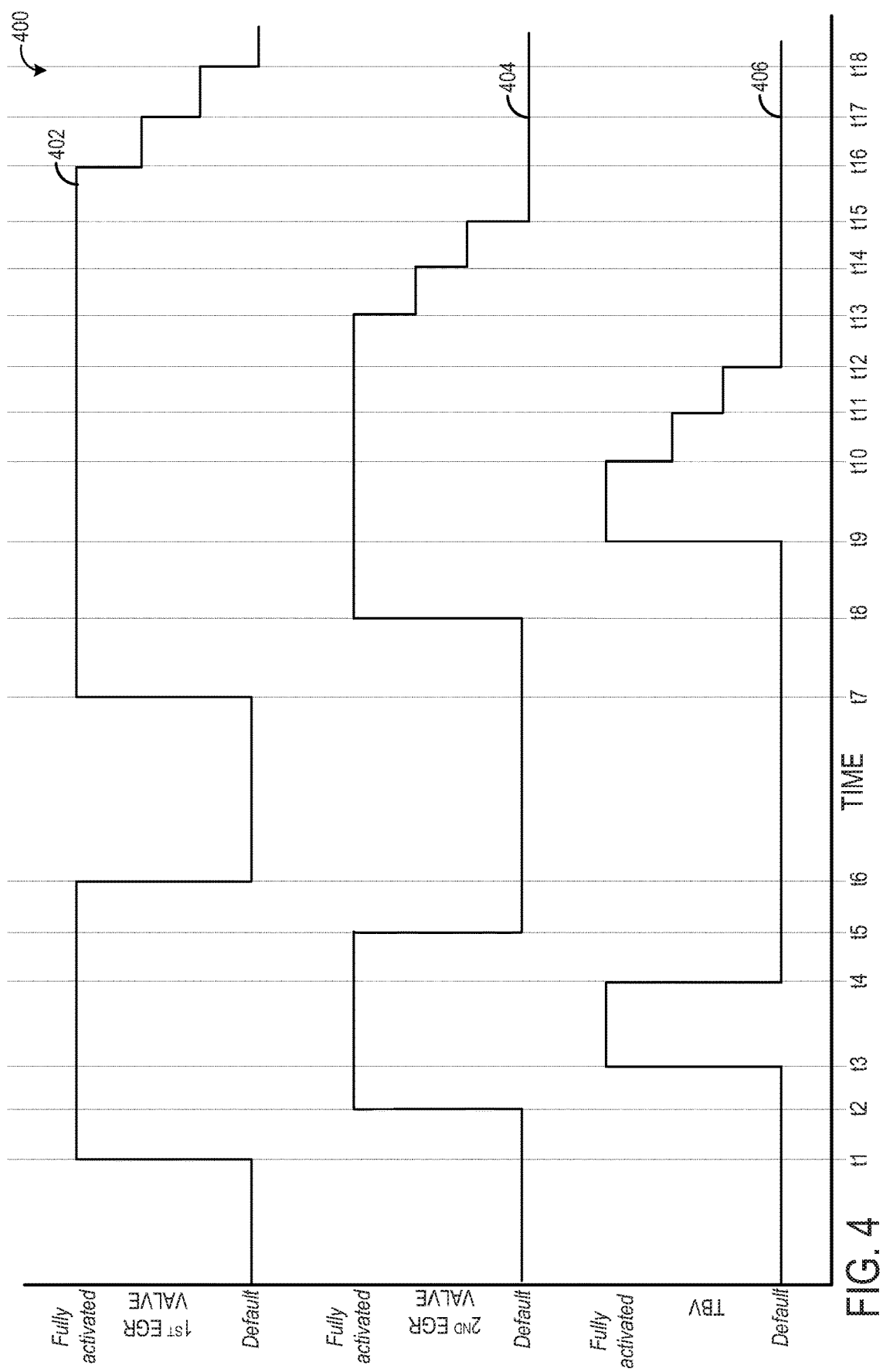
FIG. 4 shows example plots showing the position of a plurality of exhaust valves during calibration of the valves.

If the conditions for exhaust valve calibration are met, the method 200 proceeds to 208 to calibrate the exhaust valves, as further described in FIGS. 3A and 3B. Briefly, the calibration includes generating one or more calibration maps correlating position sensor output to exhaust valve position and the driving current needed to drive the valve to a given exhaust valve position, such as the first calibration map and second calibration map described above. After calibration of the exhaust valves at 208, the method 200 proceeds to 210, where the valve position(s) is adjusted based on operating conditions (such as designated intake oxygen concentration) and the calibration output from the calibration performed at 208. As described above at 206, the current position of the exhaust valve (e.g., EGR metering valve, EGR bypass valve, or TBV) may be determined based on the output from the associated position sensor and first calibration map. The current position is compared to a desired position, and if the current position is different from the desired position, the driving current needed to reach the desired position is determined from the second calibration map. This amount of current may then be supplied to the exhaust valve. Additionally, output from the position sensor may be monitored and input into the first calibration map as feedback to determine if the desired valve position is reached.

In some examples, method 200 optionally includes diagnosing one or more exhaust valves based on the calibration output at 212. For example, the slope of the line generated when correlating valve position sensor output to valve position may be analyzed and if the slope is different than expected, it may be determined that the position sensor for that exhaust valve is degraded and/or that the exhaust valve itself is degraded (e.g., stuck open or stuck closed). In other examples, the hysteresis and/or the response time of the exhaust valve may be determined based on the calibration output.

In another example, after the calibration process is complete one or more of the calibration maps do not fall within expected variation bounds, then another calibration process may be performed directly after the initial calibration process. Further, during normal operation of the engine (e.g., not during a calibration process), if a valve position does not seem to be tracking the commanded position (e.g., the current command), then additional valve calibration processes may be performed. These additional calibration processes may occur opportunistically (e.g., wait for idle conditions and run it only while the operator is calling for idle), or if severe enough, they may also occur in a restrictive manner (e.g., restrict operation to idle to force a re-calibration). Additionally, if the calibration results continue to fall outside of the expected healthy bounds, then the valve/position feedback sensor may be determined to be degraded, and a notification may be output to an operator to service the exhaust valve or position feedback sensor. Method 200 then returns.

Thus, method 200 adjusts the position of an exhaust valve based on operating parameters and calibration data for that exhaust valve. As explained above, method 200 may be applied to one or more exhaust valves, such as EGR metering valve 170, EGR bypass valve 164, and TBV 128 of FIG. 1A. As such, to generate the calibration data, each of the exhaust valves undergoes a separate calibration routine to generate a first and a second calibration map for each exhaust valve. Because the calibration routine is performed during engine operation, it may be advantageous to perform the routine as quickly as possible. Thus, as explained in more detail below, the calibration routines for the exhaust valves may at least partially overlap to expedite the amount of time it takes to perform the calibration routines for all the valves.

FIGS. 3A and 3B illustrate a method 300 for calibrating a plurality of exhaust valves, such as the TBV 128 and the EGR valves 164 and 170 described in FIG. 1A. While FIGS. 3A and 3B are described with respect to calibrating three exhaust valves simultaneously, it is to be understood that each valve could be calibrated separately. Further, FIGS. 3A and 3B are described with respect to calibration of a first EGR valve, a second EGR valve, and a turbine bypass valve. In some examples, the first EGR valve may comprise the EGR metering valve described above (valve 170 of FIG. 1A) and the second EGR valve may comprise the EBR bypass valve (valve 164 of FIG. 1A). A first calibration map based on position sensors sensing the valve position of each of the valves is generated by a controller and stored in the memory of the controller, as described in FIG. 3A. A second calibration map is generated by measuring and storing the electric current driving each valve position ranging from fully closed to partially open to fully open, as shown in FIG. 3B. In one example, method 300 may be carried out as part of method 200 described above.

In FIG. 3A, the method 300 includes operating the engine at idle speed/load conditions at 302. At 304, fuel injection to the donor cylinders is shut off (e.g., cylinders 107 of FIG. 1A). As explained above, by operating with fuel supplied to only one bank of cylinders (the non-donor cylinders), and by recirculating the non-combusted exhaust from the donor cylinders back to the engine, low intake oxygen concentrations that may otherwise occur during the calibration may be avoided.

The method 300 then proceeds to 306, where each exhaust valve is cycled its full range, from a default resting location to a fully activated position, for a specified number of times (e.g., three) to remove any debris stuck to the valves. During the cycling of the exhaust valves, and remainder of the calibration routine described below, the two EGR valves (e.g., valves 164 and 170) cannot be closed at the same time. If both EGR valves were to be closed simultaneously, no exhaust would be able to leave the donor cylinders, causing high donor exhaust backpressure that may result in engine degradation. In one example, the second EGR valve may remain open/partially open while the first EGR valve goes through the full range cycles. Subsequently, the second EGR valve may be cycled while the first EGR valve remains open/partially open, as indicated at 308.

The method 300 proceeds to 310, where each valve is returned to its default resting/deactivated position. The method 300 proceeds to 312, where the position sensor output for each valve in the respective deactivated position is stored. At 314, the first EGR valve is moved from the default resting position to the fully activated position. In one example, the default position for the first EGR valve may be fully closed and the fully activated position may be fully open. However, other positions are within the scope of this disclosure. This is followed by moving the second EGR valve from a default position to a fully activated position. The TBV is then moved from its resting position to its fully activated position.

The first and the second EGR valve positions are moved from the default position to the fully open position such that the two EGR valves never closed at the same time, as indicated at 316. For example, as described above the default position of the first EGR valve may be fully closed. The default position of the second EGR valve may be fully open. As such, at least one of the first and second EGR valves is at least partially open during the entirety of moving each exhaust valve to its fully activated position. In one example, during calibration of the first EGR valve and calibration of the second EGR valve, when the first EGR valve is closed, the second EGR valve is at least partially open and when the second EGR valve is closed, the first exhaust valve is at least partially open. Further, the calibration of the TBV is at least partly overlapping with calibration of the first EGR and the second EGR valves. This includes the first EGR valve being fully open when the TBV is fully open and/or the second EGR valve being fully closed, in order to direct all exhaust from the donor cylinders to the intake as described above, to avoid bogging the engine. At 318, the position sensor output capturing the valve positions at each fully activated position for each exhaust valve is stored.

At 320, calibration maps are generated for each valve based on the stored position sensor output (stored at 312 and at 318). The calibration maps may be stored in the memory of a controller. In one example, each calibration map may include a linear function based on the position sensor output at the fully deactivated position and at the fully activated position. Therein, based on the linear function, the exhaust valve position for a given position sensor output (e.g., voltage) may be determined. For the exhaust valves, the position sensor (e.g., LVDT) output is two voltages, but this linear function which is calibrated to is the position vs. voltage ratio. Specifically, the input to the linear function for position uses a voltage ratio defined as $(Va-Vb)/(Va+Vb)$, where Va and Vb are the two voltage readings (RMS) from the sensor.

FIG. 3B shows a continuation of the method 300, where calibration maps are generated correlating exhaust valve position for each exhaust valve to the driving current needed to reach that position, for example the current needed to move a given valve to fully open, partially open, and fully closed positions. After generating the calibration maps based on position sensor output at 320 of FIG. 3A, the method 300 proceeds to 322, where the TBV is commanded to move from the fully activated position to a first partial position, followed by a second partial position, and then to a fully deactivated position. The first partial position and second partial position may each be intermediate positions between fully activated and fully deactivated. For example, the first partial position may be 66% of fully activated and the second partial position may be 33% of fully activated. Other partial positions are possible, such as 75% and 25%. In this way, if the fully activated position of the TBV is fully open, the TBV may be commanded to a first partial open position and a second, less open partial open position.

At this point in the calibration routine, the relationship between driving current and TBV position is not known. Accordingly, the TBV is commanded to predetermined intermediate current values, and then the routine measures and stores the corresponding calibrated position feedback.

The intermediate current values may be chosen to lie on a predicted linear portion of the driving current vs. valve position calibration map.

At 324, the position sensor output is sampled at each position of the TBV and stored in memory of the controller. Further, in some examples, the electric driving current used to move the TBV to each position is also stored in the memory of the controller. At 326, method 300 generates a second calibration map for the TBV based on the first TBV calibration map (generated at 320 of FIG. 3A) and based on the measured position of the TBV determined by the position sensor output sampled at 324. The second calibration map correlates the position of the TBV to the corresponding driving current supplied to the TBV. For example, generating the second calibration map may include measuring the position of the TBV at each commanded position using the position sensor of the TBV and the first calibration map. The second calibration map may be generated by plotting the driving current that is supplied to reach each commanded position with the actual TBV position as output from the first calibration map.

At 328, the second EGR valve is moved from the fully activated position to a first partial position, then to a second partial position, and then to a fully deactivated position. Similar to the TBV, the first partial position and second partial position may each be intermediate positions between fully activated and fully deactivated. For example, the first partial position may be 66% of fully activated and the second partial position may be 33% of fully activated. Other partial positions are possible, such as 75% and 25%. In this way, if the fully activated position of the second EGR valve is fully closed, the second EGR valve may be commanded to a first partial closed position and a second, less closed partial closed position.

At this point in the calibration routine, the relationship between driving current and second EGR valve position is not known. Accordingly, the second EGR valve is commanded to predetermined intermediate current values, and then the routine measures and stores the corresponding calibrated position feedback. The intermediate current values may be chosen to lie on a predicted linear portion of the driving current vs. valve position calibration map.

The position sensor output is sampled at each position of the second EGR valve and stored in memory of the controller at 330. Further, in some examples, the electric current used to drive the second EGR valve to each of the positions is also stored in the memory of a controller. A second calibration map for the second EGR is generated at 332, based on the first calibration map (generated at 320 of FIG. 3A) and based on the measured second EGR valve positions determined by the position sensor output sampled at 330, similar to the generation of the second calibration map for the TBV described above.

At 334, the first EGR valve is moved from the fully activated position to a first partial position, to a second partial position, and finally to a fully deactivated position. The first partial position and second partial position may each be intermediate positions between fully activated and fully deactivated. For example, the first partial position may be 66% of fully activated and the second partial position may be 33% of fully activated. Other partial positions are possible, such as 75% and 25%. In this way, if the fully activated position of the first EGR valve is fully open, the first EGR valve may be commanded to a first partial open position and a second, less open partial open position.

At this point in the calibration routine, the relationship between driving current and first EGR valve position is not known. Accordingly, the first EGR valve is commanded to predetermined intermediate current values, and then the routine measures and stores the corresponding calibrated position feedback. The intermediate current values may be chosen to lie on a predicted linear portion of the driving current vs. valve position calibration map.

The position sensor output is sampled at each position of the first EGR valve and stored in memory of the controller at 336. Further, in some examples, the driving electric current supplied to move the first EGR valve to each of the positions may be stored in the memory of the controller. At 338, a second calibration map for the first EGR valve is generated, based on the first calibration map generated at 320 of FIG. 3A and measured first EGR valve positions determined by the position sensor output sampled at 336, as described above. Method 300 then ends.

Thus, two calibration maps generated for each of the two EGR valves and for TBV during engine idle operating conditions correlate the valve position to the corresponding driving electric current needed to move the valve to the specified position. In one example, for a given exhaust valve, a "closed" point is set and the driving current (at the closed point) is equated to "fully closed." Then the driving current flips all the way to open and sets that driving current as "fully opened." Then, a linear function between the driving current at fully closed and the driving current at fully open provides a map for operating that valve at all the partial spots between close and open. That is, 50% of the difference between the closed driving current and the open driving current is mapped as 50% opening/restriction for that valve. The linear function may be tuned using the driving current for one or more intermediate positions, for example.

The calibration routine includes activating and deactivating the exhaust valves in a specific order to avoid engine operation issues during the calibration routine. For example, the TBV is moved back to its fully deactivated/closed position prior to the EGR valves being moved back to their default/no EGR positions in order to avoid excessive intake manifold vacuum and engine bog. Further, the TBV and second EGR valve are commanded to respective fully deactivated positions, and then the first EGR valve is commanded to its fully deactivated position, such that both EGR valves are never closed simultaneously.

While the generation of the second calibration maps described above in method 300 includes supplying a plurality of different driving currents to each valve and measuring the respective valve positions using the respective position sensor at each of the supplied driving currents, in some examples the calibration routine may additionally or alternatively include commanding each valve to a plurality of different positions (e.g., fully open, fully closed, and partially open) as determined by feedback from the respective position sensor, and measuring the driving current at each valve position in order to generate the second calibration maps.

FIG. 4 is an example plot 400 showing the position of the first and the second EGR valves and the TBV during a calibration event, such as during execution of method 300 described above. Each respective valve position is indicated on the Y axis, ranging from a default resting position to a fully activated position for each of the valves and the time is shown on the X axis. The commanded valve position for the first EGR valve is illustrated by curve 402, the commanded valve position for the second EGR valve is illustrated by curve 404, and the commanded valve position for the TBV is illustrated by curve 406.

During a clean-out routine performed prior to the first calibration event, when the engine is operating under idle conditions, the first EGR valve is moved from a default resting position to a fully activated position at time t1. After a specified amount of time the first EGR valve is moved again from fully activated position back to the default resting position, at time t6. The second EGR valve and the TBV are also moved from their respective resting default positions to fully activated positions at time t2 and t3, respectively, and after a specified time are moved back from the fully activated position to the default position, at time t5 and t4, respectively. There is overlap in the time when each of the two EGR valves and the TBV are in the respective fully activated positions (e.g., time t3-t4). Also, the first EGR valve and the second EGR valve are never closed at the same time. In one example, the default resting position of the first EGR valve may be fully closed, the default resting position of the second EGR valve is fully open, and the TBV default resting position is fully closed, ensuring that the first and second EGR valves are not closed at the same time when in their default resting positions or when fully activated. This process may remove any debris from the valves that may interfere with the calibration routine, and may also be repeated (e.g., the valves may be cycled open and closed three times).

The calibration routine then commences at time t7, wherein the position sensor output for each valve in each respective default position is sampled and stored, and the first EGR valve is first moved from its default resting position to a fully activated position. This is followed by commanding the fully activated first EGR valve to a first partially activated position at time t16, a second partially activated position at time t17, and a default resting (e.g., fully deactivated) position at time t18. The second EGR valve is also moved from its default position to a fully activated position, at time t8, and subsequently is moved from fully activated to a first partially open position at time t13, second partially position at time t14, and to the default (e.g., fully deactivated) position at time t15.

The TBV is commanded to its fully activated position at time t9. The TBV is then commanded to the first partial position at time t10, the second partial position at time t11, and the fully deactivated position at time t12. Accordingly, each of the exhaust valves is in its respective fully activated position during time t9 to t10, and each exhaust valve is stepped down through the plurality of partial positions at different times. In doing so, the first and second EGR valves are never closed simultaneously. Further, each time the TBV is fully opened (which in the example presented herein includes the TBV being fully activated), the first EGR valve, which controls flow of exhaust gas from the donor cylinders to the intake, is fully open (herein, fully activated) and the second EGR valve is fully closed (herein, fully activated).

A first calibration map based on position sensor output, mapping the position of each of the valves at the fully deactivated position and fully activated position (e.g., based on the position sensor output sampled for all the valve prior to or at time t7, and based on the position sensor output for the TBV at time t7, the position sensor output for the second EGR valve at time t8, and the position sensor output for the first EGR valve at time t9) may be generated and stored in the memory of a controller, as described in FIG. 3A. A second calibration map is also generated during this routine, wherein the intermediate valve positions are measured by the respective position sensors and mapped with the electric current driving each of the valve positions, as described in FIG. 3B.

In this way, a calibration routine for the two EGR valves and the TBV, correlating valve position to the measure of electric current needed to drive the valves to that position, may be used to position the exhaust valves in a desired position to control exhaust emissions and provide desired torque, for example. The calibration routine is a two-step process that first determines the position sensor (e.g., LVDT) voltage feedback resulting from no current being supplied to the exhaust valves and full current being supplied to the exhaust valves (on the assumption that these currents correspond to fully closed/open). This feedback provides the information to calibrate the position sensor feedback. Next, the routine determines the (now calibrated) position feedback resulting from two or more known intermediate current values. This provides the information to calibrate the valve driving current to achieve a given valve position.

An embodiment for a system is provided, comprising an exhaust valve configured to control flow of exhaust gas exiting an engine; and a controller configured to calibrate the exhaust valve by: commanding the exhaust valve to a fully closed position and determining a first driving current of the exhaust valve at the fully closed position, commanding the exhaust valve to a fully open position and determining a second driving current of the exhaust valve of the fully open position, and generating a map based on a linear function determined from the first driving current and the second driving current. The controller is further configured to adjust a position of the exhaust valve based on the map.

Another embodiment for a system includes an exhaust valve configured to control flow of exhaust gas exiting an engine; and a controller configured to calibrate the exhaust valve by: commanding the exhaust valve to a fully closed position with a first driving current and measuring a first position of the exhaust valve at first driving current, commanding the exhaust valve to a fully open position with a second driving current and measuring a second position of the exhaust valve at the second driving current, and generating a map based on a linear function determined from the first driving current, the second driving current, the measured first position, and the measured second position, the controller further configured to adjust a position of the exhaust valve based on the map.

In an example, the first driving current may be an amount of current that maintains the exhaust valve in a default, deactivated position. For example, the first driving current may be no current, and the default position for the exhaust valve may be fully closed. The second driving current may be an amount of current that moves or maintains the exhaust valve into a fully activated position. For example, the second driving current may be a maximum amount of current the exhaust valve actuator is configured to receive, and the fully activated position may be fully open.

The controller may be configured to calibrate the exhaust valve responsive to one or more of an engine start event or a threshold amount of time elapsing since a previous engine start event or calibration event. The exhaust valve may be a first exhaust valve controlling flow of exhaust gas to an intake system of the engine, and the system may further comprise a second exhaust valve controlling flow of exhaust gas to atmosphere. The controller may be further configured to calibrate the second exhaust valve, calibration of the first exhaust valve at least partly overlapping with calibration of the second exhaust valve, and during calibration of the first exhaust valve and calibration of the second exhaust valve, when the first exhaust valve is closed, the second exhaust valve is at least partially open and when the second exhaust valve is closed, the first exhaust valve is at least partially open.

The engine is coupled to the intake system and to an exhaust system, and the system may further comprise an exhaust gas recirculation (EGR) passage coupling the exhaust system to the intake system. The first exhaust valve may be a first EGR valve controlling flow of exhaust gas through the EGR passage and the second exhaust valve may be a second EGR valve controlling flow of exhaust gas from the engine through the exhaust system to atmosphere. The controller may be configured to: store the map generated during calibration of the first EGR valve in memory of the controller and store a second map generated during the calibration of the second EGR valve in memory of the controller; and during normal engine operation, adjust a position of one or more of the first EGR valve or the second EGR valve based on one or more of the map or second map to provide a designated intake oxygen concentration. As used herein, "normal engine operation" may include any operating conditions other than the calibration routine described above with respect to FIGS. 3A and 3B. In other examples, the normal engine operation may include additional or alternate engine operating conditions, such as all operating conditions while the vehicle in which the engine is installed is moving, steady-state operating conditions, non-emergency operating conditions, or other suitable operating conditions.

In examples, the engine comprises a first group of cylinders coupled to a first exhaust manifold and a second group of cylinders coupled to a second exhaust manifold, the first exhaust manifold coupled to the intake system via the first EGR valve and coupled to atmosphere via the second EGR valve, the second exhaust manifold configured to provide exhaust exclusively to atmosphere. The system may further comprise a turbocharger including a turbine positioned in the exhaust system and a compressor positioned in the intake system; and a turbine bypass valve coupled across the turbine. The controller may be further configured to calibrate the turbine bypass valve, including fully opening the turbine bypass valve during a portion of the calibration of the turbine bypass valve, calibration of the turbine bypass valve at least partly overlapping with calibration of the first EGR valve and calibration of the second EGR valve, and responsive to the turbine bypass valve being fully open, the controller is configured to maintain the second EGR valve in a fully closed position, and wherein calibration of the first EGR valve, calibration of the second EGR valve, and calibration of the turbine bypass valve are performed during idle engine operation with fuel injection to the first group of cylinders suspended.

Another embodiment relates to a method, comprising: correlating output of a first exhaust gas recirculation (EGR) valve position sensor to a position of a first EGR valve and a driving current supplied to the first EGR valve; correlating output of a second EGR valve position sensor to a position of a second EGR valve and a driving current supplied to the second EGR valve; and operating an engine while controlling an amount of exhaust gas supplied to an air intake of the engine based at least in part on a desired position of at least one of the first EGR valve or second EGR valve and at least one of the driving current supplied to the first EGR valve and the driving current supplied to the second EGR valve, respectively.

The method may further comprise calibrating a turbine bypass valve including correlating output of a turbine bypass valve position sensor to a position of the turbine bypass valve, and correlating the position of the turbine bypass valve to a driving current supplied to the turbine bypass valve. The correlating the output of the first EGR valve position sensor, the second EGR valve position sensor, and the turbine bypass valve position sensor may each include storing one or more calibration maps in memory, wherein one or more of the first EGR valve, second EGR valve, and turbine bypass valve are adjusted based on the one or more calibration maps, and wherein correlating the output of the first EGR valve position sensor, second EGR valve position sensor, and turbine bypass valve position sensor are performed responsive to an engine start event.

In an example, correlating the output of the first EGR valve position sensor and the second EGR valve position sensor comprises maintaining at least one of the first EGR valve or the second EGR valve at least partly open during the correlating of the output of first EGR valve position sensor and of the second EGR valve position sensor, wherein the first EGR valve, second EGR valve, and turbine bypass valve are coupled in an exhaust system coupled to an engine, wherein calibrating the turbine bypass valve comprises fully opening the turbine bypass valve, and further comprising, responsive to the turbine bypass valve being fully opened during the calibration, maintaining the second EGR valve fully closed and suspending fuel injection to a subset of cylinders of the engine. In one example, the subset of cylinders may include donor cylinders configured to supply exhaust gas to an intake of the engine.

Another embodiment relates to a system. The system includes a first exhaust gas recirculation (EGR) valve; a first EGR valve position sensor configured to measure a position of the first EGR valve; a second EGR valve; a second EGR valve position sensor configured to measure a position of the second EGR valve; and a controller. The controller is configured to correlate output of the first EGR valve position sensor to a position of the first EGR valve and a driving current supplied to the first EGR valve; correlate output of the second EGR valve position sensor to a position of the second EGR valve and a driving current supplied to the second EGR valve; and operate an engine while controlling an amount of exhaust gas supplied to an air intake of the engine based at least in part on a desired position of at least one of the first EGR valve or second EGR valve and at least one respective driving current.

The system may further comprise a turbine bypass valve coupled around a turbocharger turbine and a turbine bypass valve position sensor configured to measure a position of the turbine bypass valve, and the controller may be configured to calibrate the turbine bypass valve by correlating output of a turbine bypass valve position sensor to a position of the turbine bypass valve, and correlate the position of the turbine bypass valve to a driving current supplied to the turbine bypass valve. To correlate the output of the first EGR valve position sensor, the second EGR valve position sensor, and the turbine bypass valve position sensor, the controller may be configured to store one or more respective calibration maps in memory, wherein one or more of the first EGR valve, second EGR valve, and turbine bypass valve are adjusted based on the one or more calibration maps, and the correlating the output of the first EGR valve position sensor, second EGR valve position sensor, and turbine bypass valve position sensor are performed responsive to an engine start event.

In an example, to correlate the output of the first EGR valve position sensor and the second EGR valve position sensor, the controller may be configured to maintain at least one of the first EGR valve or the second EGR valve at least partly open during the correlating of the output of first EGR valve position sensor and of the second EGR valve position sensor, wherein the first EGR valve, second EGR valve, and turbine bypass valve are coupled in an exhaust system coupled to an engine. To calibrate the turbine bypass valve, the controller may be configured to fully open the turbine bypass valve, and responsive to the turbine bypass valve being fully opened during the calibration, maintain the second EGR valve fully closed. In one example, during the calibration, fuel injection to a subset of cylinder of the engine may be suspended, and the subset of cylinders may include donor cylinders configured to supply exhaust gas to an intake of the engine.

An embodiment of a system comprises an engine coupled to an exhaust system; an exhaust valve configured to control exhaust gas flow through the exhaust system; a position sensor configured to measure a position of the exhaust valve; and a controller. The controller is configured to calibrate the exhaust valve and position sensor by generating a first calibration map that correlates position sensor output to exhaust valve position and generating a second calibration map that correlates exhaust valve position to exhaust valve driving current; determine a current position of the exhaust valve based on the first calibration map and a voltage signal output from the position sensor; and when the current position is different than a designated position of the exhaust valve, adjust the position of the exhaust valve by adjusting an amount of current supplied to the exhaust valve, the amount of current supplied to the exhaust valve based on the designated position of the exhaust valve and the second calibration map.

The exhaust valve may be a hydraulically actuated valve that is actuated via engine oil, and the controller may be configured to calibrate the exhaust valve and position sensor responsive to an engine start event. To generate the first calibration map, the controller may be configured to: determine a first position sensor output at a first, default position of the exhaust valve; determine a second position sensor output at a second, fully activated position of the exhaust valve; and generate the first calibration map based on the first position sensor output and the second position sensor output. To generate the second calibration map, the controller may be configured to supply a first amount of driving current to the exhaust valve; determine a third position of the exhaust valve at the first amount of driving current based on position sensor output and the first calibration map; supply a second amount of driving current to the exhaust valve; determine a fourth position of the exhaust valve at the second amount of driving current based on position sensor output and the first calibration map; and generate the second calibration map based on the determined third position and fourth position of the exhaust valve.

In examples, the controller is further configured to, prior to calibrating the exhaust valve and position sensor, cycle the exhaust valve between a first, default position and a second, fully activated position. In examples, the exhaust valve is a first exhaust gas recirculation (EGR) valve configured to control flow of exhaust gas from a first subset of cylinders of the engine to an intake of the engine or a second EGR valve configured to control flow of exhaust gas from a first subset of cylinders of the engine to atmosphere. In examples, the exhaust valve is a turbine bypass valve configured to control flow of exhaust gas around a turbine of a turbocharger positioned in the exhaust system.

In examples, the exhaust valve is a first exhaust gas recirculation (EGR) valve configured to control flow of exhaust gas from a first subset of cylinders of the engine to an intake of the engine, and the system further comprises a second EGR valve configured to control flow of exhaust gas from a first subset of cylinders of the engine to atmosphere and a turbine bypass valve configured to control flow of exhaust gas around a turbine of a turbocharger positioned in the exhaust system. In examples, the controller is further configured to calibrate the second EGR valve and a corresponding second position sensor by generating a third calibration map that correlates second position sensor output to second EGR valve position and generating a fourth calibration map that correlates second EGR valve position to second EGR valve driving current; calibrate the turbine bypass valve and a corresponding third position sensor by generating a fifth calibration map that correlates third position sensor output to turbine bypass valve position and generating a sixth calibration map that correlates turbine bypass valve position to turbine bypass valve driving current; determine a current position of the second EGR valve based on the third calibration map and a voltage signal output from the second position sensor; determine a current position of the turbine bypass valve based on the fifth calibration map and a voltage signal output from the third position sensor; when the current position of the second EGR valve is different than a designated position of the second EGR valve, adjust the position of the second EGR valve by adjusting an amount of current supplied to the second EGR valve, the amount of current supplied to the second EGR valve based on the designated position of the second EGR valve and the fourth calibration map; and when the current position of the turbine bypass valve is different than a designated position of the turbine bypass valve, adjust the position of the turbine bypass valve by adjusting an amount of current supplied to the turbine bypass valve, the amount of current supplied to the turbine bypass valve based on the designated position of the turbine bypass valve and the sixth calibration map.

In an example, the turbine is a high-pressure turbine of a high-pressure turbocharger, and the system further includes a high-pressure compressor coupled to the high-pressure turbine; a low-pressure turbine positioned in the exhaust system downstream of the high-pressure turbine, the low-pressure turbine including a casing housing a rotor; a drain passage coupled to the casing; and an air jet coupled to the drain passage, the air jet configured to supply intake air from an outlet of the high-pressure compressor to the drain passage.

An embodiment of a method comprises calibrating an exhaust valve and position sensor, the exhaust valve configured to control exhaust gas flow through an exhaust system of an engine and the position sensor configured to measure a position of the exhaust valve, by generating a first calibration map that correlates position sensor output to exhaust valve position and generating a second calibration map that correlates exhaust valve position to exhaust valve driving current; determining a current position of the exhaust valve based on the first calibration map and a voltage signal output from the position sensor; and when the current position is different than a designated position of the exhaust valve, adjusting the position of the exhaust valve by adjusting an amount of current supplied to the exhaust valve, the amount of current supplied to the exhaust valve based on the designated position of the exhaust valve and the second calibration map.

The exhaust valve may be a hydraulically actuated valve that is actuated via engine oil, and the controller may be configured to calibrate the exhaust valve and position sensor responsive to an engine start event. Generating the first calibration map may include determining a first position sensor output at a first, default position of the exhaust valve; determining a second position sensor output at a second, fully activated position of the exhaust valve; and generating the first calibration map based on the first position sensor output and the second position sensor output. Generating the second calibration map may include supplying a first amount of driving current to the exhaust valve; determining a third position of the exhaust valve at the first amount of driving current based on position sensor output and the first calibration map; supplying a second amount of driving current to the exhaust valve; determining a fourth position of the exhaust valve at the second amount of driving current based on position sensor output and the first calibration map; and generating the second calibration map based on the determined third position and fourth position of the exhaust valve.

In examples, the method may include, prior to calibrating the exhaust valve and position sensor, cycling the exhaust valve between a first, default position and a second, fully activated position. In examples, the exhaust valve is a first exhaust gas recirculation (EGR) valve configured to control flow of exhaust gas from a first subset of cylinders of the engine to an intake of the engine or a second EGR valve configured to control flow of exhaust gas from a first subset of cylinders of the engine to atmosphere. In examples, the exhaust valve is a turbine bypass valve configured to control flow of exhaust gas around a turbine of a turbocharger positioned in the exhaust system.

In examples, the exhaust valve is a first exhaust gas recirculation (EGR) valve configured to control flow of exhaust gas from a first subset of cylinders of the engine to an intake of the engine, the exhaust system of the engine may include a second EGR valve configured to control flow of exhaust gas from a first subset of cylinders of the engine to atmosphere and a turbine bypass valve configured to control flow of exhaust gas around a turbine of a turbocharger positioned in the exhaust system. In examples, calibrating the second EGR valve and a corresponding second position sensor includes generating a third calibration map that correlates second position sensor output to second EGR valve position and generating a fourth calibration map that correlates second EGR valve position to second EGR valve driving current; calibrating the turbine bypass valve and a corresponding third position sensor includes generating a fifth calibration map that correlates third position sensor output to turbine bypass valve position and generating a sixth calibration map that correlates turbine bypass valve position to turbine bypass valve driving current; determining a current position of the second EGR valve based on the third calibration map and a voltage signal output from the second position sensor; determining a current position of the turbine bypass valve based on the fifth calibration map and a voltage signal output from the third position sensor; when the current position of the second EGR valve is different than a designated position of the second EGR valve, adjusting the position of the second EGR valve by adjusting an amount of current supplied to the second EGR valve, the amount of current supplied to the second EGR valve based on the designated position of the second EGR valve and the fourth calibration map; and when the current position of the turbine bypass valve is different than a designated position of the turbine bypass valve, adjusting the position of the turbine bypass valve by adjusting an amount of current supplied to the turbine bypass valve, the amount of current supplied to the turbine bypass valve based on the designated position of the turbine bypass valve and the sixth calibration map.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
an exhaust valve configured to control flow of exhaust gas exiting an engine; and
a controller configured to calibrate the exhaust valve by:
commanding the exhaust valve to a fully closed position with a first driving current and measuring a first position of the exhaust valve at the first driving current,
commanding the exhaust valve to a fully open position with a second driving current and measuring a second position of the exhaust valve at the second driving current, and
generating a map based on a linear function determined from the first driving current, the second driving current, the measured first position, and the measured second position,
the controller further configured to adjust a position of the exhaust valve based on the map.

2. The system of claim 1, wherein the controller is configured to calibrate the exhaust valve responsive to one or more of an engine start event or a threshold amount of time elapsing since a previous engine start event or calibration event.

3. The system of claim 1, wherein the exhaust valve is a first exhaust valve controlling flow of exhaust gas to an intake system of the engine, wherein the system further comprises a second exhaust valve controlling flow of exhaust gas to atmosphere, and wherein the controller is further configured to calibrate the second exhaust valve, calibration of the first exhaust valve at least partly overlapping with calibration of the second exhaust valve, and during calibration of the first exhaust valve and calibration of the second exhaust valve, when the first exhaust valve is closed, the second exhaust valve is at least partially open and when the second exhaust valve is closed, the first exhaust valve is at least partially open.

4. The system of claim 3, wherein the engine is coupled to the intake system and to an exhaust system; and
further comprising an exhaust gas recirculation (EGR) passage coupling the exhaust system to the intake system, and wherein the first exhaust valve is a first EGR valve controlling flow of exhaust gas through the EGR passage and the second exhaust valve is a second EGR valve controlling flow of exhaust gas from the engine through the exhaust system to atmosphere.

5. The system of claim 4, wherein the controller is configured to:
store the map generated during calibration of the first EGR valve in memory of the controller and store a second map generated during the calibration of the second EGR valve in memory of the controller; and
during normal engine operation, adjust a position of one or more of the first EGR valve or the second EGR valve based on one or more of the map or the second map to provide a designated intake oxygen concentration.

6. The system of claim 4, wherein the engine comprises a first group of cylinders coupled to a first exhaust manifold and a second group of cylinders coupled to a second exhaust manifold, the first exhaust manifold coupled to the intake system via the first EGR valve and coupled to atmosphere via the second EGR valve, the second exhaust manifold configured to provide exhaust exclusively to atmosphere.

7. The system of claim 6, further comprising:
a turbocharger including a turbine positioned in the exhaust system and a compressor positioned in the intake system; and
a turbine bypass valve coupled across the turbine,
wherein the controller is further configured to calibrate the turbine bypass valve, including fully opening the turbine bypass valve during a portion of the calibration of the turbine bypass valve, calibration of the turbine bypass valve at least partly overlapping with calibration of the first EGR valve and calibration of the second EGR valve, and responsive to the turbine bypass valve being fully open, the controller is configured to maintain the second EGR valve in a fully closed position, and wherein calibration of the first EGR valve, calibration of the second EGR valve, and calibration of the turbine bypass valve are performed during idle engine operation where fuel injection to the first group of cylinders is suspended.

8. A method, comprising:
correlating output of a first exhaust gas recirculation (EGR) valve position sensor of an engine to a position of a first EGR valve of the engine and a driving current supplied to the first EGR valve;
correlating output of a second EGR valve position sensor of the engine to a position of a second EGR valve of the engine and a driving current supplied to the second EGR valve;
operating the engine while controlling an amount of exhaust gas supplied to an air intake of the engine based at least in part on a desired position of at least one of the first EGR valve or the second EGR valve and at least of the driving current supplied to the first EGR valve or the driving current supplied to the second EGR valve, respectively; and
calibrating a turbine bypass valve of the engine including correlating output of a turbine bypass valve position sensor of the engine to a position of the turbine bypass valve, and correlating the position of the turbine bypass valve to a driving current supplied to the turbine bypass valve.

9. The method of claim 8, wherein the correlating the output of the first EGR valve position sensor, the second EGR valve position sensor, and the turbine bypass valve position sensor each includes storing one or more calibration maps in memory, wherein one or more of the first EGR valve, the second EGR valve, and the turbine bypass valve are adjusted based on the one or more calibration maps, and wherein correlating the output of the first EGR valve position sensor, the second EGR valve position sensor, and the turbine bypass valve position sensor are performed responsive to an engine start event.

10. The method of claim 8, wherein correlating the output of the first EGR valve position sensor and the second EGR valve position sensor comprises maintaining at least one of the first EGR valve or the second EGR valve at least partly open during the correlating of the output of first EGR valve position sensor and of the second EGR valve position sensor, wherein the first EGR valve, the second EGR valve, and the turbine bypass valve are coupled in an exhaust system coupled to the engine, wherein calibrating the turbine bypass valve comprises fully opening the turbine bypass valve, and further comprising, responsive to the turbine bypass valve being fully opened during the calibration, maintaining the second EGR valve fully closed.

11. A system, comprising:
an engine coupled to an exhaust system;
an exhaust valve configured to control exhaust gas flow through the exhaust system;
a position sensor configured to measure a position of the exhaust valve; and
a controller configured to:
calibrate the exhaust valve and the position sensor by generating a first calibration map that correlates position sensor output to exhaust valve position and generating a second calibration map that correlates exhaust valve position to exhaust valve driving current;
determine a current position of the exhaust valve based on the first calibration map and a voltage signal output from the position sensor; and
when the current position is different than a designated position of the exhaust valve, adjust the position of the exhaust valve by adjusting an amount of current supplied to the exhaust valve, the amount of current supplied to the exhaust valve based on the designated position of the exhaust valve and the second calibration map.

12. The system of claim 11, wherein the exhaust valve is a hydraulically actuated valve that is actuated via engine oil, and wherein the controller is configured to calibrate the exhaust valve and the position sensor responsive to an engine start event.

13. The system of claim 12, wherein to generate the first calibration map, the controller is configured to:
determine a first position sensor output at a first, default position of the exhaust valve;
determine a second position sensor output at a second, fully activated position of the exhaust valve; and
generate the first calibration map based on the first position sensor output and the second position sensor output.

14. The system of claim 13, wherein to generate the second calibration map, the controller is configured to:

supply a first amount of driving current to the exhaust valve;

determine a third position of the exhaust valve at the first amount of driving current based on position sensor output and the first calibration map;

supply a second amount of driving current to the exhaust valve;

determine a fourth position of the exhaust valve at the second amount of driving current based on position sensor output and the first calibration map; and generate the second calibration map based on the determined third position and fourth position of the exhaust valve.

15. The system of claim 11, wherein the controller is further configured to, prior to calibrating the exhaust valve and the position sensor, cycle the exhaust valve between a first, default position and a second, fully activated position.

16. The system of claim 11, wherein the exhaust valve is a first exhaust gas recirculation (EGR) valve configured to control flow of exhaust gas from a first subset of cylinders of the engine to an intake of the engine, a second EGR valve configured to control flow of exhaust gas from the first subset of cylinders of the engine to atmosphere, or a turbine bypass valve configured to control flow of exhaust gas around a turbine of a turbocharger positioned in the exhaust system.

17. The system of claim 11, wherein the exhaust valve is a first exhaust gas recirculation (EGR) valve configured to control flow of exhaust gas from a first subset of cylinders of the engine to an intake of the engine, and further comprising a second EGR valve configured to control flow of exhaust gas from the first subset of cylinders of the engine to atmosphere and a turbine bypass valve configured to control flow of exhaust gas around a turbine of a turbocharger positioned in the exhaust system.

18. The system of claim 17, wherein the controller is further configured to:

calibrate the second EGR valve and a corresponding second position sensor by generating a third calibration map that correlates a second position sensor output to a second EGR valve position and generating a fourth calibration map that correlates the second EGR valve position to the second EGR valve driving current;

calibrate the turbine bypass valve and a corresponding third position sensor by generating a fifth calibration map that correlates a third position sensor output to a turbine bypass valve position and generating a sixth calibration map that correlates the turbine bypass valve position to a turbine bypass valve driving current;

determine a current position of the second EGR valve based on the third calibration map and a voltage signal output from the second position sensor;

determine a current position of the turbine bypass valve based on the fifth calibration map and a voltage signal output from the third position sensor;

when the current position of the second EGR valve is different than a designated position of the second EGR valve, adjust the position of the second EGR valve by adjusting an amount of current supplied to the second EGR valve, the amount of current supplied to the second EGR valve based on the designated position of the second EGR valve and the fourth calibration map; and when the current position of the turbine bypass valve is different than a designated position of the turbine bypass valve, adjust the position of the turbine bypass valve by adjusting an amount of current supplied to the turbine bypass valve, the amount of current supplied to the turbine bypass valve based on the designated position of the turbine bypass valve and the sixth calibration map.

19. The system of claim 17, wherein the turbine is a high-pressure turbine of a high-pressure turbocharger, and further comprising:

a high-pressure compressor coupled to the high-pressure turbine;

a low-pressure turbine positioned in the exhaust system downstream of the high-pressure turbine, the low-pressure turbine including a casing housing a rotor;

a drain passage coupled to the casing; and an air jet coupled to the drain passage, the air jet configured to supply intake air from an outlet of the high-pressure compressor to the drain passage.

* * * * *